F. DEUTSCH AND J. H. RIEDLING.
PISTON RING.
APPLICATION FILED APR. 13, 1917.
1,360,733. Patented Nov. 30, 1920.
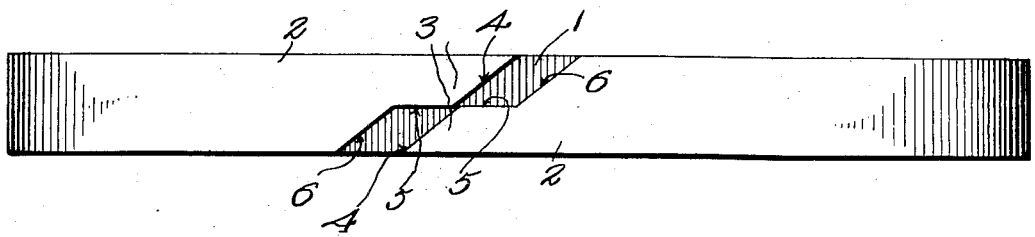
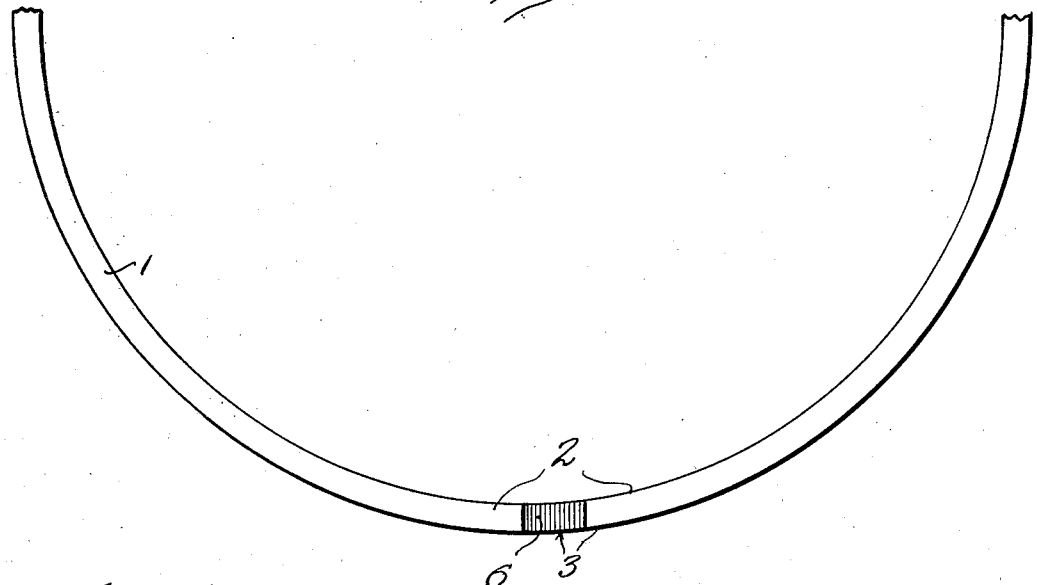
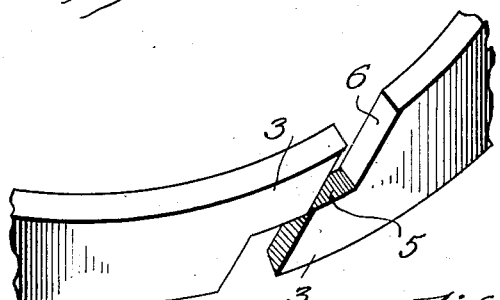
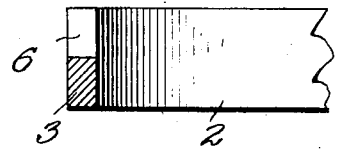
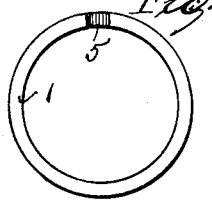
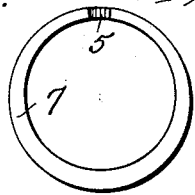
Inventors
F. Deutsch and
J. H. Riedling
their Attorneys

UNITED STATES PATENT OFFICE.

FRITZ DEUTSCH AND JOHN H. RIEDLING, OF MEMPHIS, TENNESSEE, ASSIGNORS, BY DIRECT AND MESNE ASSIGNMENTS, OF ONE-THIRD TO SAID DEUTSCH, ONE-THIRD TO SAID RIEDLING, AND ONE-THIRD TO J. E. McCADDEN.

PISTON-RING.

1,360,733.  Specification of Letters Patent.  Patented Nov. 30, 1920.

Application filed April 13, 1917. Serial No. 161,797.

*To all whom it may concern:*

Be it known that we, FRITZ DEUTSCH and JOHN H. RIEDLING, subjects of the Emperor of Austria, residing at Memphis, in the county of Shelby and State of Tennessee, have invented certain new and useful Improvements in Piston-Rings, of which the following is a specification, reference being had therein to the accompanying drawing.

This invention relates to piston rings and particularly such rings as are useful in connection with internal combustion engines.

It is an object of the invention to produce a ring of the character described which combines desirable and superior efficiency in service, with extreme simplicity and economy in manufacture; thus being distinguished from such piston rings as the multiple, or the rings made by elaborate patching and sawing operations.

In the drawings which represent an illustrative embodiment of the invention:

Figure 1 is an elevation of the ring;

Fig. 2 is a plan of a part thereof;

Fig. 3 is a perspective view, showing the joint; and

Fig. 4 is a sectional view taken through one of the two projections.

The ring of this invention may be of the ordinary single ring type such as has been known for many years as for instance in the form of the "step cut" single rings. Such single rings are exceedingly cheap to make, the joint therein being susceptible of being made by radial milling operations, as distinguished from elaborate sawing operations, and our ring may also so be made. We shall now describe the joint.

The ring 1, having meeting ends 2, is formed at each end into a projection 3, each projection being in this illustration about one half the width of the ring, so that the two projections make up the ring width when overlapped. The median faces 5 of the two projections are adapted to slide one on the other as the ring is contracted by the pressure of the cylinder wall, or expands to take up wear, so that at all times so long as the projections 3 are overlapped there is provided a joint which closes under pressure. This is an important feature in piston rings which of course are designed and used to prevent loss of compression.

The ends of the projections 3 are inclined, as shown at 4, and the shoulders, against which those ends rest when the ring is closed or compressed are correspondingly inclined, as shown at 6. Thus when the ring is closed or compressed in service, there will be produced in coöperative combination; a diagonal cut, beginning at the top of the ring, extending half way through it, then offset peripherally and passing the rest of the way through the ring out of line with the first half of the cut, while a horizontal lap joint self closing under pressure, serves to interrupt and space the two halves of the diagonal cut. Thus the ring embodies the advantages of a horizontal lap joint, and in addition those of a diagonal cut, the former advantages relating to capacity to prevent leakage; the latter to prevention of injury to the cylinder which may occur when sharp vertical corners are employed as in the "step cut" rings previously referred to.

Nevertheless the ring is exceedingly cheap to make, and may be made by the same operations as those by which a "step cut" ring is made, merely by milling on an incline, to form the surfaces 4, 5 and 6 instead of at right angles to the plane of the ring to form the corresponding surface in a "step cut" ring.

In the preferred illustrative embodiment, the inclination of the interrupted diagonal cut is about 45° to the plane of the ring, and we have used an obtuse angle between the surfaces 4 and 6. These features are desirable in that a 45° angle has proved to be entirely satisfactory in use; and an obtuse angle at the base of the projections will advantageously serve to prevent "checking," in the starting of a crack at the base of the projection, which would more easily occur if the median surface 5 of the projections formed an acute angle with shoulder 1. The scope of the invention in its broader aspects is not limited to these features, however, but is more properly set forth in the appended claims.

Having described our invention, we claim:—

1. A ring having a space extending from one edge obliquely inwardly and another space extending from the opposite edge inwardly and parallel with the first space and having a depth and width sufficent to meet but not enter the first space, the inner walls of the spaces lying substantially in a single plane whereby they may slide on each other as the ring contracts and expands.

2. A one piece expansible split piston ring embodying in combination when compressed a diagonal cut and a horizontal lap joint, said ring being divided and formed at its ends with overlapping projections, the overlapping surfaces of which are adapted to slide upon each other as the ring contracts and expands; each projection having an end surface diagonally inclined to the axis of the ring and adapted to fit upon a correspondingly inclined shoulder at the base of the opposite projection, said projection being of a character and extent susceptible of being formed by removing all the material between the median face of the projection and the top or bottom of the ring.

3. A one piece expansible split piston ring embodying an end oblique to the ring axis and a lap joint which closes under pressure, said lap joint formed by providing spaces extending from the top and bottom plane of the ring toward its median plane and terminating in the same line whereby are produced projections the overlapping faces of which are adapted to slide upon each other as the ring contracts and expands.

4. A one piece expansible piston ring adapted to be exposed to the pressure of the cylinder and comprising a split expansible ring having an end oblique to the ring axis and a lap joint which closes under said pressure, said joint being formed by providing spaces extending from the top and bottom planes of the ring toward its median plane and terminating on the same line, whereby overlapping projections are formed whose overlapping faces slide upon each other as the ring contracts and expands to form a lap joint.

5. A complete piston ring unit comprising, in combination, a single integral ring presenting an integral exterior surface throughout nearly its entire circumference but having a localized split joint with mating joint surfaces comprising a cam shoulder extending clear through the thickness of the ring and disposed obliquely to the plane of the ring so as to receive fluid pressure and transmit a component thereof tending to rotate the ring circumferentially; coöperating overlapping joint surfaces extending clear through the thickness of the ring, formed integrally on the ring, and disposed substantially parallel with the plane of the ring so as to maintain an overlapping closure during circumferential expansion of the ring; the width of the ring, measured through said coöperating overlapping integral surfaces, being equal to the normal width of the main body of the ring; whereby the complete piston ring unit is susceptible of being formed from a single integral annular blank by merely removing opposite staggered marginal portions of the blank to form the joint surfaces and leave them normally spaced apart circumferentially so that when the joint is closed the piston ring has an inherent tendency to expand to the original circularity of the blank.

In testimony whereof they hereunto affix their signatures.

FRITZ DEUTSCH.
JOHN H. RIEDLING.